No. 717,118. Patented Dec. 30, 1902.
M. W. PHILLIPS.
METHOD OF TREATING CLAY OR OTHER INSOLUBLE MATERIALS.
(Application filed July 1, 1901.)
(No Model.)
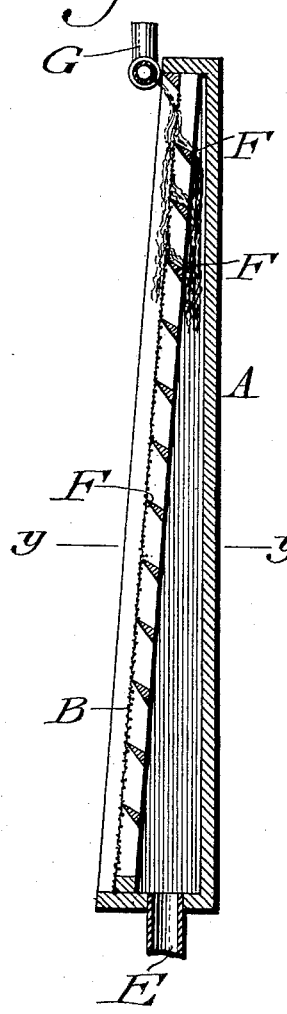
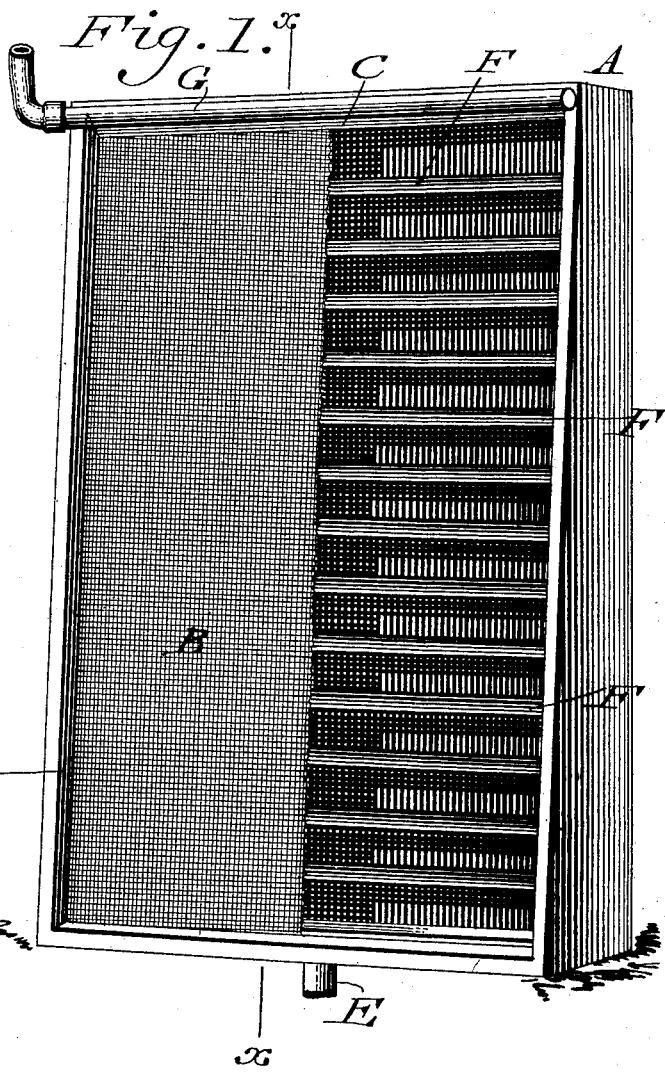
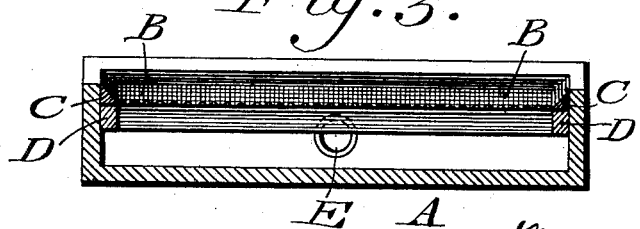
Witnesses
P. H. Argles.
L. Bouville.
Inventor
Maurice W. Phillips
By Biesenheim & Fairbanks
Attorneys

UNITED STATES PATENT OFFICE.

MAURICE W. PHILLIPS, OF PHILADELPHIA, PENNSYLVANIA, ASSIGNOR, BY MESNE ASSIGNMENTS, TO THE PENNSYLVANIA CLAY COMPANY, A CORPORATION OF NEW JERSEY.

METHOD OF TREATING CLAY OR OTHER INSOLUBLE MATERIALS.

SPECIFICATION forming part of Letters Patent No. 717,118, dated December 30, 1902.

Application filed July 1, 1901. Serial No. 66,621. (No specimens.)

*To all whom it may concern:*

Be it known that I, MAURICE W. PHILLIPS, a citizen of the United States, residing in the city and county of Philadelphia, State of Pennsylvania, have invented a new and useful Improvement in Methods of Treating Clay or other Insoluble Materials, of which the following is a specification.

In the treatment of clay and other insoluble materials for separating the coarse from the fine articles it has been usual, as far as I am informed, to separate the particles by screening, the degree of separation being dependent upon the size of the mesh employed. By my method, however, I am enabled to secure a finer product than has heretofore been obtainable by employing the finest mesh procurable or upon the market; and it consists in the employment of a fibrous screen of the finest mesh procurable and then further reducing the size of the mesh by feeding the finely-divided insoluble material thereto suspended in water, so that the expansion of the fibers due to the absorption of the water will further reduce the size of the mesh.

In the treatment of clay, for instance, to secure the finest product it is necessary to separate from the crude material the sand and other deleterious matters found therein, and in accordance with my method I first reduce the clay to a finely-divided state, so that it can be suspended in water, and then feed the liquid and suspended material to the screen of fibrous material. This screen, and in practice I have used silk of the finest mesh stretched upon a frame, absorbs a portion of the water, so that the fibers expand and reduce the size of the mesh. Some of the water and the finest particles of clay suspended therein will pass through this mesh and can be collected on one side thereof, while the mesh thus produced is so fine that the sand and other deleterious matters combined with the clay will not pass therethrough, but will pass down and over the side of the screen upon which the water and suspended material is fed, it being understood that both sides of the screen communicate with suitable outlets and places of storage for the water and suspended material thus separated by the screen.

It will be seen from the foregoing description that by my method I am enabled to conduct the screening operation with a mesh or screen that is finer than any that is procurable on the market, and, furthermore, to make the screening method more efficient I use a stationary and practically upright screen. Thus my method embodies the use of these different instrumentalities to retard the passage of the major portion of the suspended material from passing through the screen. In fact, it will thus be seen that the object of my process is to retard the passage of such material as much as possible through the screen.

To render the separating method rapid and efficient, I guide the liquid and suspended material passing through the screen away from the other side of the screen at intervals—for instance, by the use of deflectors placed in contact therewith at suitable points, which prevent the water and suspended material passing through the screen from running down the entire face thereof, which it would otherwise do in the absence of these deflectors, it being noted that if the water and suspended material passed over the entire rear face of the screen it would retard the passage of the water and suspended material through the entire surface of the screen from the front face.

In the accompanying drawings I have shown one form of apparatus for carrying out my method, in which—

Figure 1 represents a perspective view of a form of apparatus by means of which the method may be carried out. Fig. 2 represents a sectional view taken on line $x\,x$, Fig. 1. Fig. 3 represents a sectional view taken on line $y\,y$, Fig. 2.

Similar letters of reference indicate corresponding parts in the figures.

Referring to the drawings, the said apparatus consists of an upright box A, open at its front, and across the open front face of which is stretched the screen B, consisting, as I have before stated, of silk of the finest mesh. The screen B is held in position by means of cleats C and D, secured to said box, it being noted that the screen is situated in substantially an upright position—that is to say, at only such a slight angle from a vertical plane as to cause the water and suspended material to pass across the face thereof. The lower end of the box is provided with an outlet E for the discharge of the water and suspended material passing through the screen.

F designates deflectors extending transversely across the rear side of the screen and secured within the box, the edges of said deflectors contacting with the rear face of the screen and serving both to assist in holding the screen taut and for guiding the water and suspended material away from the rear face of the screen at intervals, this latter function preventing the water and suspended material that passes through the upper portion of the screen from running down the entire rear face thereof, which would materially retard the passage of the water and suspended material from the front face through the screen, through the lower portions thereof, as will be obvious.

G designates a supply-pipe extending across the upper end of the screen and provided with suitable discharge-openings through which the water and suspended material can be fed to the upper front face of the screen.

Having thus described my invention, what I claim as new, and desire to secure by Letters Patent, is—

1. The method of treating clay and other insoluble materials, which consists in reducing the material to a finely-divided state and suspending the same in a liquid, and then passing the liquid and suspended material across the face of a substantially upright stationary screen of fibrous material of finest mesh, whereby the size of the mesh is reduced by absorption of water and the passage of the suspended material through the mesh is retarded, so that only a minor portion of the suspended material passes through said screen.

2. The method of treating clay and other insoluble materials, which consists in reducing the material to a finely-divided state and suspending the same in a liquid, and then passing the liquid and suspended material across the face of a substantially upright stationary screen of fibrous material of finest mesh, whereby the size of the mesh is reduced by absorption of water and the passage of the suspended material through the mesh is retarded, so that only a minor portion of the suspended material passes through said screen, and in guiding the liquid and suspended material passing through the screen away from said screen at intervals.

MAURICE W. PHILLIPS.

Witnesses:
WM. CANER WIEDERSHEIM,
C. D. MCVAY.